(12) United States Patent
Mudigonda et al.

(10) Patent No.: US 8,040,849 B2
(45) Date of Patent: Oct. 18, 2011

(54) MAINTAINING A DATA CONNECTION DURING A DORMANT DATA SESSION WITH A WIRELESS COMMUNICATION NETWORK

(75) Inventors: Ravishanker Mudigonda, Chula Vista, CA (US); Fahed Zawaideh, San Diego, CA (US); Flora Chan, San Diego, CA (US); Niamul Khan, San Diego, CA (US); Rajashekar Chilla, San Diego, CA (US); Sriram Nagesh Nookala, San Diego, CA (US); Venugopal Ramamurthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 882 days.

(21) Appl. No.: 11/229,198

(22) Filed: Sep. 15, 2005

(65) Prior Publication Data
US 2007/0058585 A1   Mar. 15, 2007

(51) Int. Cl.
*H04Q 7/00* (2006.01)
(52) U.S. Cl. ...................... 370/331; 455/403
(58) Field of Classification Search ............... 455/422.1, 455/421, 403, 416, 426.1, 440, 456.1, 456.2, 455/550.1, 552.1; 370/331, 328, 338, 528
See application file for complete search history.

(56) References Cited

U.S. PATENT DOCUMENTS

| | | | |
|---|---|---|---|
| 6,934,272 B2 * | 8/2005 | Cheng et al. | 370/331 |
| 2002/0048266 A1 | 4/2002 | Choi et al. | |
| 2002/0055364 A1 * | 5/2002 | Wang et al. | 455/466 |
| 2004/0063431 A1 | 4/2004 | Julka et al. | |
| 2004/0071112 A1 * | 4/2004 | Hsu et al. | 370/331 |
| 2004/0203780 A1 * | 10/2004 | Julka et al. | 455/436 |

FOREIGN PATENT DOCUMENTS
WO   WO 2004064292 A2   7/2004

* cited by examiner

*Primary Examiner* — Dwayne Bost
*Assistant Examiner* — Myron Wyche
(74) *Attorney, Agent, or Firm* — Kenyon S. Jenckes; Kristine U. Ekwueme

(57) ABSTRACT

A wireless device establishes a data session with a data call, and a data connection is set up for the data session. The wireless device may receive or originate a voice call while the data session is dormant, exchange traffic data for the voice call, and perform handoff between base station controllers (BSCs), if needed, during the voice call. Upon termination of the voice call, the wireless device determines whether it has moved to a new packet zone during the voice call. This may be the case if the wireless device was handed off between BSCs located in different packet zones. If the wireless device has moved to a new packet zone, then the data connection is updated, e.g., by sending to the current serving BSC an origination message indicating no data to send. The network entities perform appropriate actions to update the data connection for the wireless device.

42 Claims, 8 Drawing Sheets

MAINTAINING A DATA CONNECTION DURING A DORMANT DATA SESSION WITH A WIRELESS COMMUNICATION NETWORK

BACKGROUND

I. Field

The present disclosure relates generally to communication, and more specifically to techniques for maintaining a data connection during a dormant data session with a wireless communication network.

II. Background

Wireless communication networks are widely deployed to provide various communication services such as voice, packet data, broadcast, messaging, and so on. These wireless networks may be multiple-access networks capable of supporting communication with multiple users by sharing the available system resources. Examples of such multiple-access networks include Code Division Multiple Access (CDMA) networks, Time Division Multiple Access (TDMA) networks, Frequency Division Multiple Access (FDMA) networks, and Orthogonal Frequency Division Multiple Access (OFDMA) networks.

A wireless device (e.g., a cellular phone) may originate a packet data call to establish a data session with a wireless network. As part of the data call setup, a data connection is established among network entities that will serve the wireless device for the data session, which are called serving network entities. Thereafter, the wireless device may send or receive packet data via the serving network entities. The data session may be sporadically active for only a small portion of the time and may be dormant for much of the time.

The wireless device may roam while the data session is dormant and may move out of the coverage of the serving network entities. In some instances, the wireless device may not be able to update the data connection to new network entities that can serve the wireless device for the data session. This may be the case, for example, if the wireless device has an ongoing voice call and is not permitted to send signaling during the voice call to update the data connection for the data session. If the data connection is not updated and the wireless network thereafter has packet data to send to the wireless device, then the wireless device may miss the packet data because the data connection is erroneous.

There is therefore a need in the art for techniques to maintain a data connection during a dormant data session.

SUMMARY

Techniques for maintaining a data connection during a dormant data session with a wireless communication network are described herein. A wireless device establishes the data session via a data call, and a data connection is set up for the data session. The data session is associated with state information such as a packet zone identifier (PZID) for a packet zone in which the wireless device is located when the data session is established.

Thereafter, the wireless device may receive or originate a second call (e.g., a voice call) while the data session is dormant and would then transition to a Traffic state. The wireless device exchanges traffic data for the second call and performs handoff between base station controllers (BSCs), if needed, during the second call. Upon termination of the second call, the wireless device transitions to an Idle state and determines whether it has moved to a new packet zone during the second call. This may be the case if the wireless device was handed off between BSCs that are located in different packet zones. If the wireless device has moved to a new packet zone, then the data connection for the data session is updated, e.g., by sending to the current serving BSC an Origination Message with an indication that there is no data to send. The network entities perform appropriate actions to update the data connection for the wireless device. The wireless device uses the PZID for the new packet zone for the data session.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for maintaining a data connection may be used for various wireless communication networks such as CDMA, TDMA, FDMA, and OFDMA networks. A CDMA network may utilize a radio access technology (RAT) such as cdma2000 or Wideband-CDMA (W-CDMA). RAT refers to the technology used for radio communication. cdma2000 covers IS-95, IS-2000, and IS-856 standards. A TDMA network may utilize a RAT such as Global System for Mobile Communications (GSM) or Digital Advanced Mobile Phone System (D-AMP). A GSM network may utilize General Packet Radio Service (GPRS) for packet data transmission. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. For clarity, the techniques are described below for a cdma2000 network.

Figure 1:
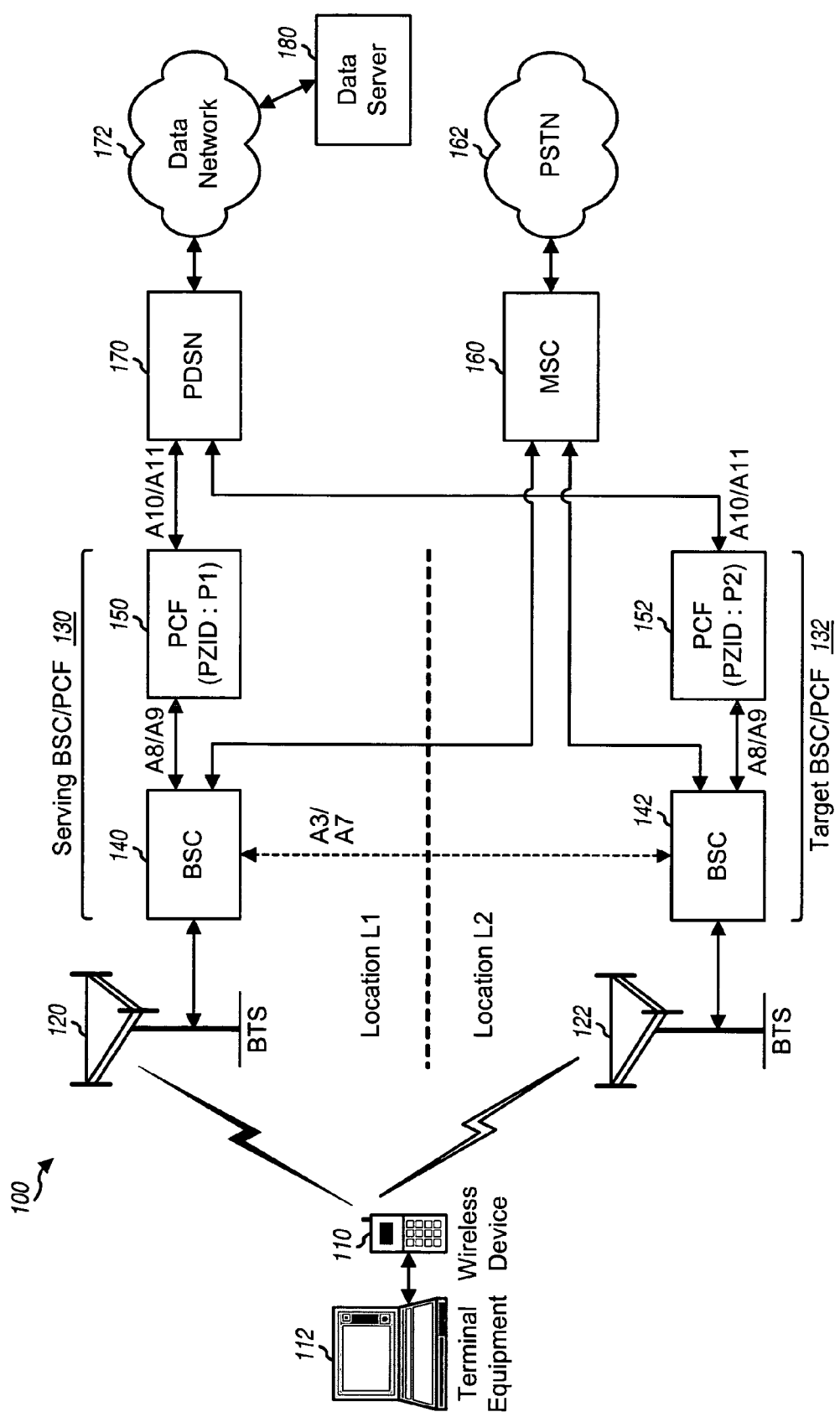
FIG. 1 shows a wireless communication network.

FIG. 1 shows a cdma2000 network 100 that supports voice and packet data services for wireless devices. Network 100 includes a number of base transceiver systems (BTSs) 120 and 122 that provide radio communication for wireless devices located within the coverage of these BTSs. A BTS is a fixed station that communicates with the wireless devices and may also be called a base station, a Node B, an access point, and so on. A BTS and/or its coverage area are often referred to as a "sector". Each BTS 120 couples to a base station controller (BSC) that provides coordination and control for that BTS.

Each BSC typically controls multiple BTSs that are deployed in a given geographic area. For the example shown in FIG. 1, BSC 140 controls BTS 120 in location L1, and BSC 142 controls BTS 122 in location L2. Each BSC handles allocation of traffic channels, receives measurements from the wireless devices, and controls handoff of the wireless devices among the BTSs controlled by that BSC. Each BSC may couple to a mobile switching center (MSC) 160 that supports voice services and to a packet control function (PCF) 150 that supports packet data services. MSC 160 provides routing for circuit-switched calls and performs mobility management for wireless devices located within the area served by the MSC. MSC 160 couples to a public switched telephone network (PSTN) 162, which serves conventional plain old telephones (POTS).

Each PCF 150 couples to packet data serving node (PDSN) 170 and controls the transmission of packet data between the BSCs coupled to that PCF and the PDSN. The area served by each PCF is called a packet zone and is identified by a unique PZID. PDSN 170 supports packet data services for wireless devices. For example, PDSN 170 is responsible for the establishment, maintenance, and termination of PPP (Point-to-Point Protocol) sessions for the wireless devices and may also assign dynamic Internet Protocol (IP) addresses to these wireless devices. PDSN 170 couples to a data network 172, which may be the Internet and/or some other public and/or private data networks. A data server 180 and other entities may also couple to data network 172 and may exchange packet data with PDSN 170.

The network entities within network 100 communicate via specified interfaces. For example, BSCs 140 and 142 may exchange traffic data and signaling via A3 and A7 interfaces, e.g., for a wireless device that is handed off from a source BSC to a target BSC, with the source BSC (and not the target BSC) being an anchor BSC for the wireless device. BSCs 140/142 and PCFs 150/152 exchange traffic data via an A8 interface and signaling via an A9 interface. PCFs 150/152 and PDSN 170 exchange traffic data via an A10 interface and signaling via an A11 interface. The interfaces between other network entities are not shown in FIG. 1 for simplicity.

A wireless device 110 may communicate with zero, one, or multiple BTSs at any given moment, depending on whether the wireless device is active and whether the wireless device is in handoff. Wireless device 110 may be referred to as a mobile station (MS), a user equipment (UE), a user terminal, and so on. Wireless device 110 may also be a cellular phone, a personal digital assistant (PDA), a modem card, or some other wireless communication device or apparatus. Wireless device 110 may be coupled to a terminal equipment 112 and used to provide/support wireless data services for the terminal equipment. Terminal equipment 112 may be a laptop computer, a PDA, or some other computing device.

A network entity that serves wireless device 110 is called a "serving" network entity. A network entity to which wireless device 110 may be handed off is called a "target" network entity. For the example shown in FIG. 1, BSC 140 and PCF 150 are the serving BSC and the serving PCF, respectively, for wireless device 110 and are collectively referred to as serving BSC/PCF 130. BSC 142 and PCF 152 are the target BSC and the target PCF, respectively, for wireless device 110 and are collectively referred to as target BSC/PCF 132. The area served by BSC 140 and PCF 150 is called location L1, and the area served by BSC 142 and PCF 152 is called location L2. PCF 150 is assigned a PZID of P1, and PCF 152 is assigned a PZID of P2.

The techniques described herein may be used for a hard handoff (HHO) scenario in which a wireless device is handed off from one BSC to another BSC, as shown in FIG. 1. The techniques may also be used for an inter-BSC soft handoff (SHO) scenario in which a wireless device moves to a new BTS (e.g., BTS 122) but call control is still maintained by the current serving BSC (e.g., BSC 140). For the SHO scenario, the serving BSC routes messages and data for the wireless device to a new BSC (e.g., BSC 142) via an A3/A7 connection between these two BSCs, and the new BSC forwards the messages and data to the new BTS.

Figure 2:
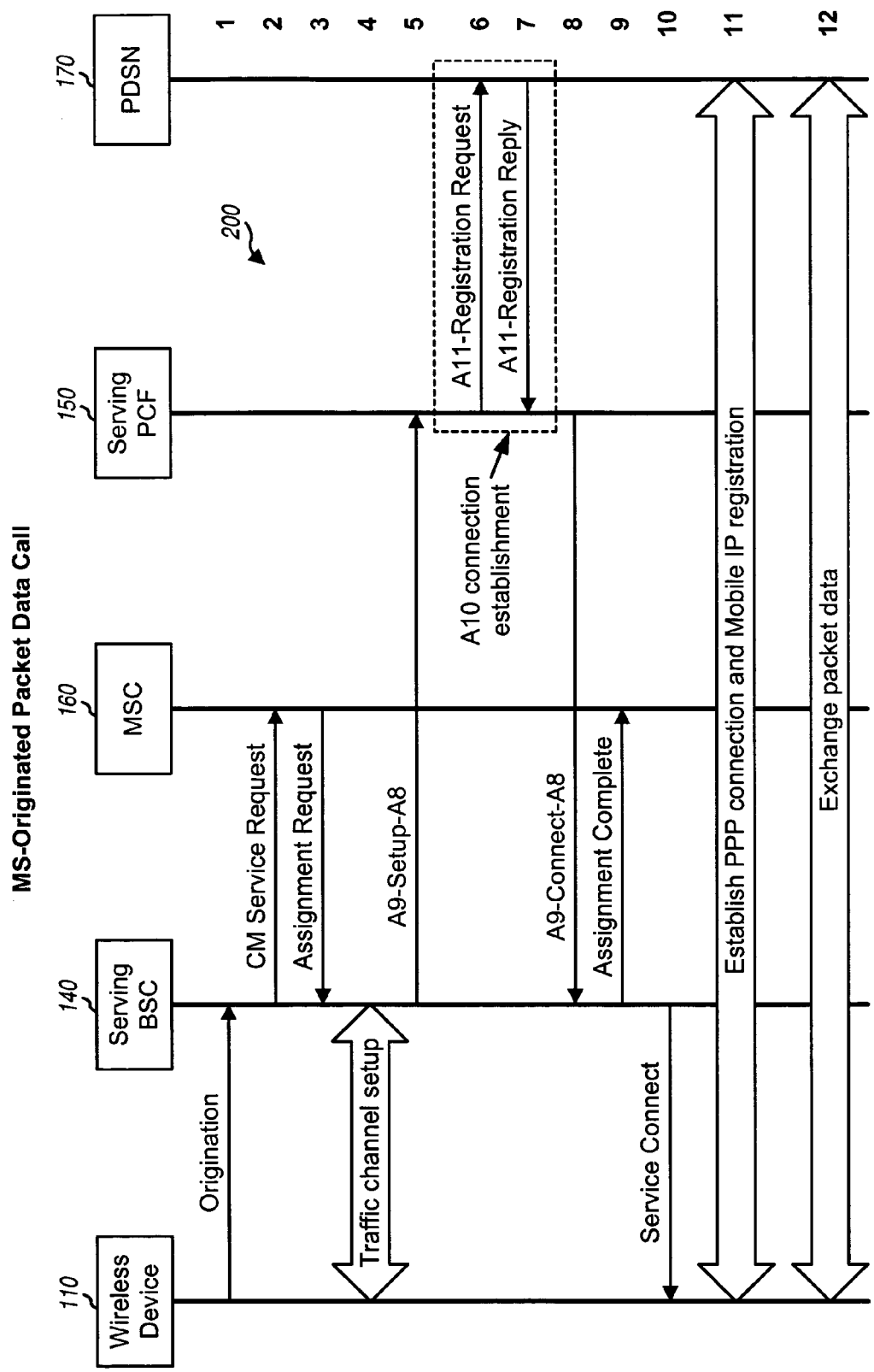
FIG. 2 shows a call flow for packet data call origination by a wireless device.

FIG. 2 shows a call flow 200 for packet data call origination by wireless device 110. Wireless device 110 may receive a user request to originate a packet data call. In response to the user request, wireless device 110 sends an Origination Message via serving BTS 120 to serving BSC 140 to request for packet data service (step 1). The Origination Message includes pertinent information such as, e.g., a service option (SO) that indicates the type of call being placed, the capabilities of the call, and so on. The Origination Message also includes a Data Ready to Send (DRS) field that is set to '1' for a new data call or if PPP needs to be established and set to '0' for all other calls.

Serving BSC 140 then sends to MSC 160 a Connection Management (CM) Service Request message that contains the request from wireless device 110 (step 2). MSC 160 may accept the request and would then send an Assignment Request message to BSC 140 to request this BSC to assign radio resources to wireless device 110 (step 3). BSC 140 and wireless device 110 then exchange signaling to set up traffic channels (step 4). BSC 140 then sends to serving PCF 150 an A9-Setup-A8 message to request establishment of an A8 connection for activation of a packet data service instance (PDSI) (step 5). This A9-Setup-A8 message may include an International Mobile Subscriber Identity (IMSI) or an Electronic Serial Number (ESN) that uniquely identifies wireless device 110, a connection reference, quality of service parameters, a service option, and so on.

PCF 150 receives the A9-Setup-A8 message from BSC 140 and recognizes that an A10 connection is not available for wireless device 110. PCF 150 then assigns a PCF session identifier (PCF SID) for the data session with wireless device 110 and selects a PDSN to serve wireless device 110 based on a PDSN selection algorithm. PCF 150 then sends an A11-Registration Request message to selected PDSN 170 to initiate establishment of an A10 connection for wireless device 110 (step 6). The A11-Registration Request message may include the IMSI for wireless device 110, the PCF SID, an IP address for PCF 150, a lifetime for the A10 connection and other pertinent information.

PDSN 170 validates the A11-Registration Request message from PCF 150, accepts the A10 connection request, and assigns a PDSN session identifier (PDSN SID), which may be set equal to the PCF SID. PDSN 170 creates a binding record for the A10 connection, which includes an association between the PDSN SID and the IMSI for wireless device 110, a session reference ID, and the PCF addresses. PDSN 170 then returns an A11-Registration Reply message to PCF 150 to indicate acceptance of the connection request (step 7). PCF 150 and PDSN 170 thereafter use the PCF IP address (sent in the A11-Registration Request message in step 6) and the PDSN IP address (returned in the A11-Registration Reply message in step 7) as the A10 connection endpoints for packet data exchanged for wireless device 110. PCF 150 and PDSN 170 each maintain an association of the IMSI for wireless device 110 and the MN session reference ID with the A10 connection. The A10 connection may be referred to as a data connection.

PCF 150 then sends to BSC 140 an A9-Connect-A8 message that indicates successful setup of the A8 connection. BSC 140 sends to MSC 160 an Assignment Complete message to indicate successful completion of radio resource assignment to wireless device 110 (step 9). BSC 140 also sends to wireless device 110 a Service Connect message to indicate successful establishment of a data connection (step 10).

Wireless device 110 may maintain a PZID list that contains the PZIDs for all PCFs that may be able to serve the wireless device for the data session. Wireless device 110 initializes this PZID list with PZID P1 for serving PCF 150. Wireless device 110 and PDSN 170 may exchange signaling to establish a PPP connection and for mobile IP registration, if applicable (step 11). Wireless device 110 and PDSN 170 may thereafter exchange packet data via serving BSC 140 and serving PCF 150 (step 12).

PDSN 170 maintains a data session for wireless device 110 for up to the lifetime sent by serving PCF 150 and accepted by PDSN 170. The lifetime is typically long (e.g., hours or days) and is set by a network operator based on various factors such as the availability of IP addresses, security, and so on. Hence, the data session may have a long duration. Serving PCF 150 and PDSN 170 each store pertinent state information for the data session (e.g., information for the A10 connection) so that packet data may be exchanged via PCF 150 and PDSN 170 for wireless device 110 during the data session.

Wireless device 110 may operate in one of several packet data service states at any given moment during the data session. For example, wireless device 110 may be in an Active/Connected state whenever there is packet data to exchange with PDSN 170 and may be in a Dormant state if there is no packet data to exchange. The data session is considered to be dormant while in the Dormant state. Wireless device 110 may transition between the Active state and the Dormant state as needed during the data session. Wireless device 110 may sporadically exchange packet data with other entities (e.g., data server 180) via serving PCF 150 and PDSN 170 through the established A10 connection. To conserve radio resources, a radio connection is established between wireless device 110 and the serving BTS as needed to exchange packet data and is torn down when there is no data to exchange.

Wireless device 110 may operate in one of several Layer 3 processing states at any given moment. For example, wireless device 110 may be in an Idle state if there is no traffic data to exchange or in a Traffic state to actively exchange traffic data with the serving BTS. In the Idle state, wireless device 110 may monitor a paging channel (PCH) and/or other overhead channels for messages, perform idle handoff if necessary, receive or originate a call, receive or initiate a transmission, and perform other actions. In the Traffic state, wireless device 110 is assigned dedicated traffic channels to exchange traffic data with the serving BTS. Wireless device 110 may transition between the Idle state and the Traffic state depending on whether there is any traffic data to send.

Figure 3:
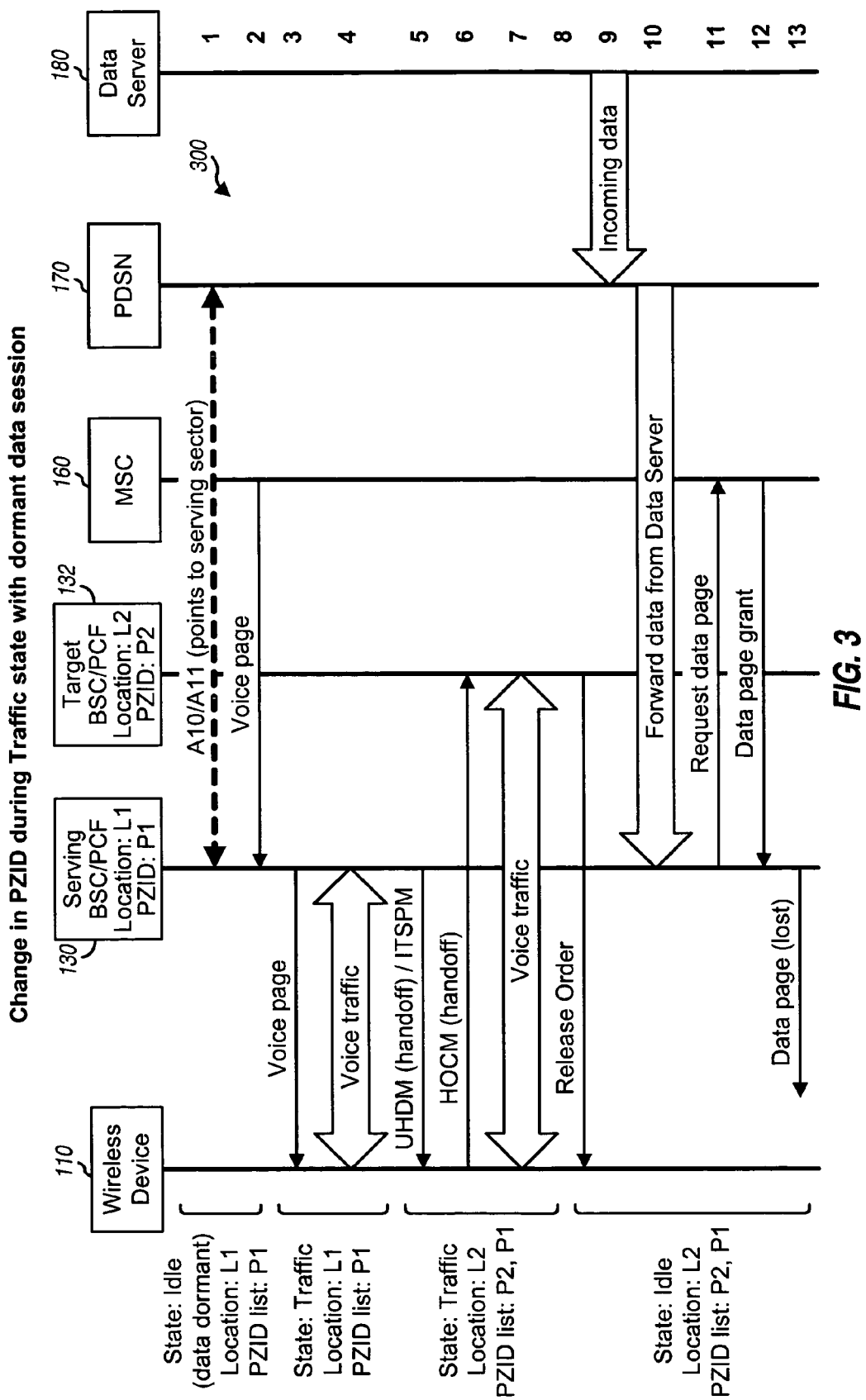
FIG. 3 shows a call flow for a voice call with handoff between BSCs in different packet zones while the data session is dormant.

FIG. 3 shows an exemplary call flow 300 for a scenario in which wireless device 110 is handed off between BSCs in different packet zones during a voice call while the data session is dormant. For call flow 300, wireless device 110 is initially in the Idle state and located in geographic area L1. Wireless device 110 is served by BSC/PCF 130 and has a PZID list that contains PZID P1 for serving PCF 150. Wireless device 110 also has a dormant data session, which may have been established with call flow 200 in FIG. 2. The A10 connection for wireless device 110 is between serving PCF 150 and PDSN 170, and the A10/A11 for the data session points to the serving sector (step 1). MSC 160 receives a voice call for wireless device 110 and sends a call connection request to BSC 140 to initiate a voice page for wireless device 110 (step 2). BSC 140 pages wireless device 110 (step 3). Upon receiving the voice page, wireless device 110 sets up the traffic channels, transitions from the Idle state to the Traffic state, and exchanges voice traffic data with serving BSC 140 (step 4).

During the voice call, wireless device 110 moves to geographic area L2 served by BSC/PCF 132. Wireless device 110 receives a Universal Handoff Direction Message (UHDM) from serving BSC 140 and an In-Traffic System Parameters Message (ITSPM) from either BSC 140 or 142 (step 5). In general, the UHDM is sent by the source BSC whereas the ITSPM may be sent by either the source BSC or the target BSC depending on which BSC is the anchor BSC or which BSC is the call control manager. The UHDM directs a handoff of wireless device 110 to target BSC 142. The ITSPM carries radio connection (e.g., traffic channel) information for target BSC 142 and PZID information. If BSC 140 continues to be the anchor BSC, then the ITSPM may include PZID P1, in which case there appears to be no change in PZID. If BSC 142 is the anchor BSC, then the ITSPM may include PZID P2, the system identifier (SID), and the network identifier (NID) for PCF 152, which serves target BSC 142. In this case, wireless device 110 may update the PZID list to include PZID P2 for PCF 152 obtained from the ITSPM. The PZID list may be ordered such that the current PZID P2 is placed at the top of the list and is used first if the data session goes active, as indicated in FIG. 3. Wireless device 110 may start a timer for PZID P1, which is pushed down from the top of the list, and may discard this PZID upon expiration of the timer. This timer may be set, e.g., to 60 seconds or some other value. Hence, the previous PZID P1 is temporarily retained in the PZID list in case wireless device 110 moves back to location L1.

Wireless device 110 performs handoff to target BSC 142 and sends a Handoff Completion Message (HOCM) that indicates a successful handoff (step 6). Wireless device 110 then exchanges voice traffic data with target BSC 142, which is the new serving BSC (step 7). Upon termination of the voice call, BSC 142 may send a Release Order to wireless device 110 to initiate release of the traffic channels (step 8). Wireless device 110 then transitions from the Traffic state to the Idle state upon receiving the Release Order.

While wireless device 110 is in the Idle state with a dormant data session, data server 180 has packet data for wireless device 110 and sends this data to PDSN 170 (step 9). PDSN 170 receives the packet data and forwards this data to PCF 150 since the A10/A11 connection for wireless device 110 points to this PCF (step 10). PCF 150 notifies BSC 140 of the incoming packet data for wireless device 110. BSC 140 then sends to MSC 160 a request for a data page of wireless device 110 (step 11). MSC 160 maintains mobility information for the wireless devices within its coverage and controls the paging of these wireless devices. MSC 160 maintains a list of BSCs for each wireless device and updates this list based on normal registration mechanisms. MSC 160 receives the data page request from BSC 140, grants permission for the data page, and sends a data page grant back to BSC 140 (step 12). BSC 140 then pages wireless device 110 (step 13). Wireless device 110 will likely miss the data page from BSC 140 since wireless device 110 has moved out of the coverage of BSC 140 earlier during the voice call. Consequently, wireless device 110 will also lose the packet data from data server 180, which is undesirable.

Figure 4:
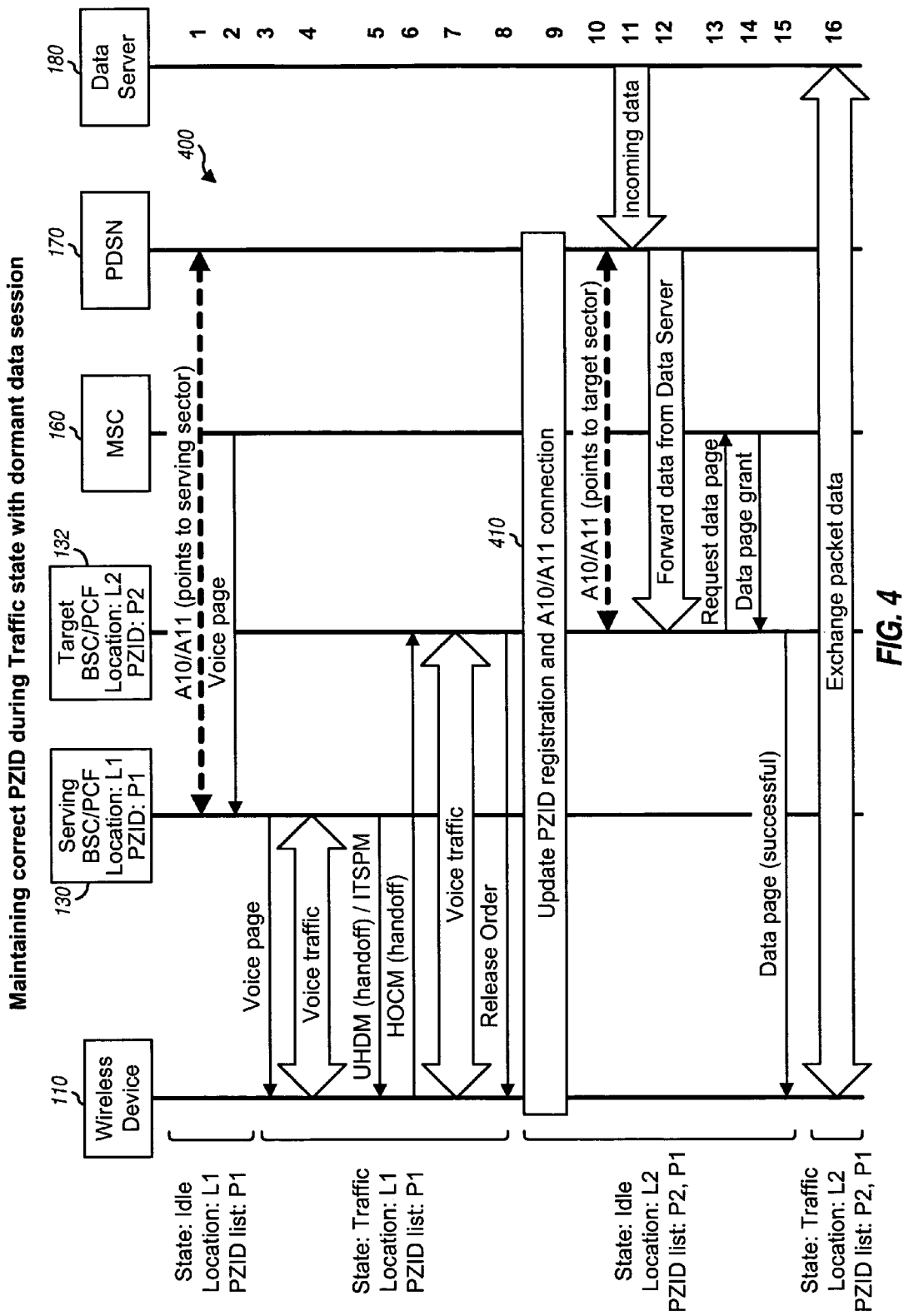
FIG. 4 shows a call flow for a voice call with handoff while the data session is dormant and for updating registration and data connection.

FIG. 4 shows an exemplary call flow 400 for a scenario in which wireless device 110 maintains correct PZID registration and A10/A11 connection even when handed off between BSCs in different packet zones during a voice call while the data session is dormant. Steps 1 through 8 of call flow 400 are the same as steps 1 through 8, respectively, of call flow 300 in FIG. 3. Wireless device 110 initially communicates with serving BSC 140 for the voice call and is handed off to target BSC 142. Upon termination of the voice call, target BSC 142 sends a Release Order to wireless device 110 to initiate release of the traffic channels (step 8).

Upon receiving the Release Order (which is a "traffic channel down" event), wireless device 110 transitions from the Traffic state to the Idle state. Wireless device 110 then updates the PZID registration and A10/A11 connection if needed in block 410, which is described below (step 9). Upon completing the update in block 410, the A10 connection for wireless device 110 is between target PCF 152 and PDSN 170, and the A10/A11 for the data session correctly points to the target sector (step 10). Wireless device 110 may update the PZID list to include PZID P2 for PCF 152, which may be obtained from the ITSPM in step 5 or the PZID registration in block 410.

While wireless device 110 is in the Idle state with a dormant data session, data server 180 has packet data for wireless device 110 and sends this data to PDSN 170 (step 11). PDSN 170 forwards the packet data to target PCF 152 since the A10/A11 connection for wireless device 110 points to this PCF (step 12). PCF 152 notifies BSC 142 of the incoming packet data for wireless device 110, and BSC 142 sends to MSC 160 a request for a data page of wireless device 110 (step 13). MSC 160 grants permission for the data page and sends a data page grant to BSC 142 (step 14). BSC 142 then pages wireless device 110 (step 15). Wireless device 110 receives the data page from BSC 142 since wireless device 110 is within the coverage of this BSC. Wireless device 110 sets up the traffic channels in response to the data page (not shown in FIG. 4). The packet data may then be exchanged between data server 180 and wireless device 110 via target BSC 142, target PCF 152, and PDSN 170 (step 16).

For the embodiment shown in FIG. 4, wireless device 110 determines whether or not to update the PZID registration and A10 connection after transitioning from the Traffic state to the Idle state. Wireless device 110 may update the PZID registration if it was handed off between BSCs located in different packet zones while in the Traffic state. Wireless device 110 receives the PZID P2 for target PCF 152 from the ITSPM sent for the handoff from serving BSC 140 to target BSC 142 and may recognize that this PZID is not included in the PZID list. However, cdma2000 does not support concurrent services. Hence, wireless device 110 is not able to initiate signaling to update the PZID registration at the time of handoff since wireless device 110 is in the Traffic state and is not able to originate another call in order to update the PZID registration. Wireless device 110 may then wait until it has transitioned out of the Traffic state and then update the PZID registration at this time.

Wireless device 110 may determine whether or not to update the PZID registration in various manners. In one embodiment, wireless device 110 maintains a variable that indicates whether a handoff was performed to a BSC in a new packet zone while in the Traffic state. Wireless device 110 updates the PZID registration upon transitioning out of the Traffic state if this variable indicates a handoff was performed to a BSC in a new packet zone. In another embodiment, wireless device 110 ascertains the current PZID upon transitioning out of the Traffic state and determines whether this PZID is included in the PZID list. If the current PZID is not in the PZID list, then wireless device 110 updates the PZID registration. In general, wireless device 110 updates the PZID registration if it has been handed off between BSCs located in different packet zones, and this determination may be made in various manners.

Figure 5:
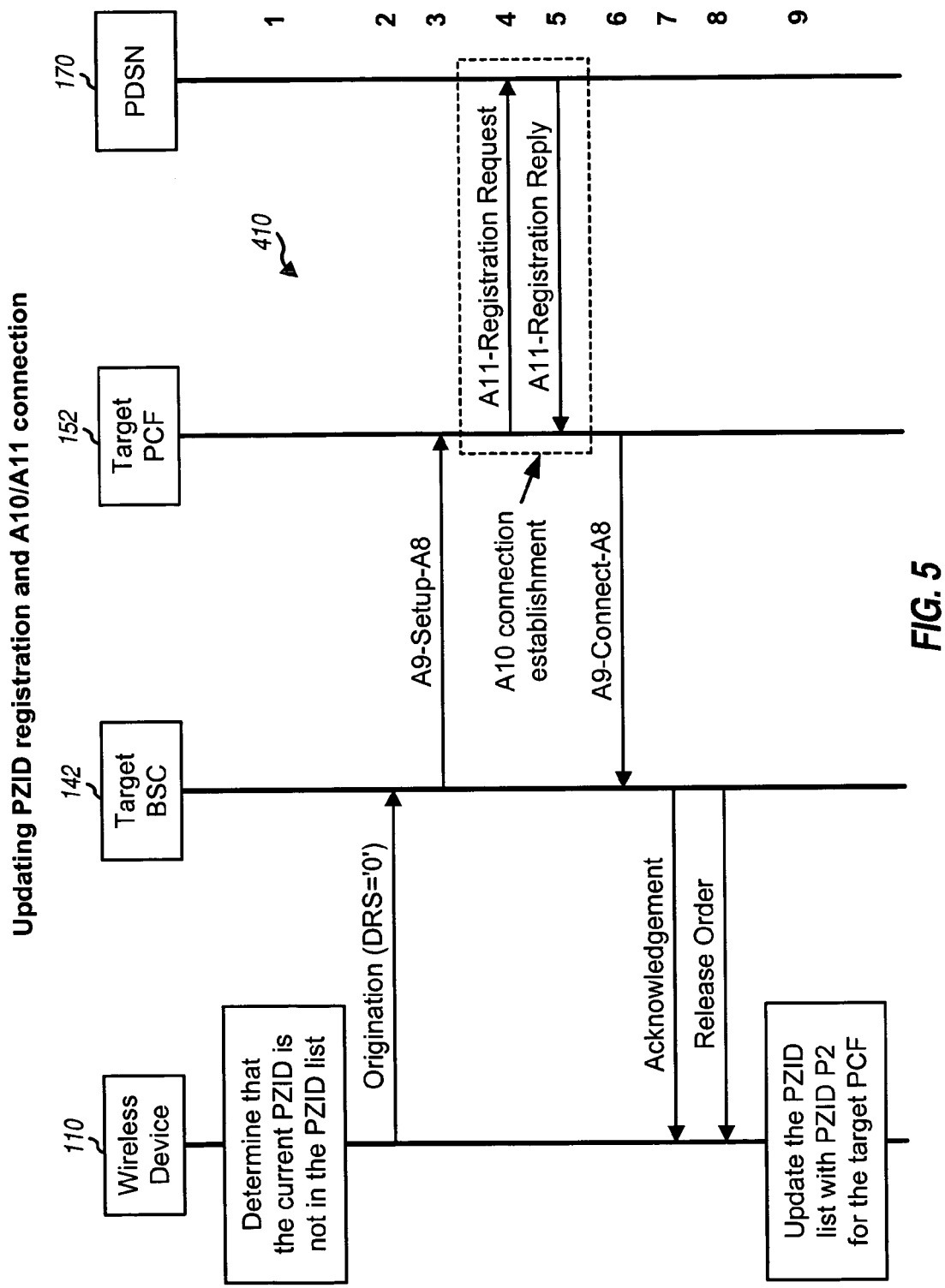
FIG. 5 shows a call flow for updating registration and data connection.

FIG. 5 shows an embodiment of a call flow initiated by wireless device 110 to update the PZID registration and A10 connection. This call flow may be used for block 410 in FIG. 4. Upon transitioning out of the Traffic state, wireless device 110 ascertains the current PZID and determines whether this PZID is in the PZID list (step 1). The current PZID is P2 after receiving the Release Order in step 8 of call flow 400 in FIG. 4. Wireless device 110 may perform this check for the current PZID at the end of each call and may update the PZID registration only if the current PZID is not in the PZID list. For call flow 500, the current PZID is not in the PZID list, and wireless device 110 sends an Origination Message to target BSC 142 to initiate updating of the PZID registration. The DRS field of the Origination Message is set to '0' to indicate that wireless device 110 does not have any data to send and is merely sending the origination request in order to update the network of the current location of wireless device 110, which may have moved to a new packet zone while the data session is dormant. Target BSC 142 receives the Origination Message (step 2) and sends to target PCF 152 an A9-Setup-A8 message to request establishment of an A8 connection (step 3).

Target PCF 152 receives the A9-Setup-A8 message from target BSC 142 and recognizes that an A10 connection is not available for wireless device 110. Target PCF 152 then assigns a PCF SID for the data session with wireless device 110, selects a PDSN for wireless device 110, and sends an A11-Registration Request message to selected PDSN 170 to initiate establishment of an A10 connection for wireless device 110 (step 4). PDSN 170 validates the A11-Registration Request message from target PCF 152, accepts the A10 connection request, assigns a PDSN SID, and creates a binding record for this A10 connection. PDSN 170 then returns an A11-Registration Reply message to target PCF 152 to indicate acceptance of the connection request (step 5). Target PCF 152 then sends to target BSC 142 an A9-Connect-A8 message that indicates successful setup of the A8 connection (step 6).

Target BSC 142 sends to wireless device 110 an Acknowledgment for the Origination Message (step 7). Target BSC 142 also sends to wireless device 110 a Release Order to end the call since there is no data to send (step 8). Upon receiving an acknowledgment that the PZID registration has been updated, wireless device 110 updates the PZID list with PZID P2 for target PCF 152. The A10/A11 for wireless device 110 now correctly points to the target sector, as shown in step 10 of call flow 400 in FIG. 4.

Wireless device 110 receives the current PZID via an ITSPM while in the Traffic state and may update the PZID registration upon transitioning to the Idle state, as shown in FIG. 5. Wireless device 110 may be roaming while in the Idle state and may be handed off from BSC to BSC using idle-mode handoff procedures. While in the Idle state, wireless device 110 may receive the current PZID from the current serving BSC via an Extended System Parameters Message (ESPM) and may initiate call flow 500 if the current PZID is not in the PZID list.

Figure 6:
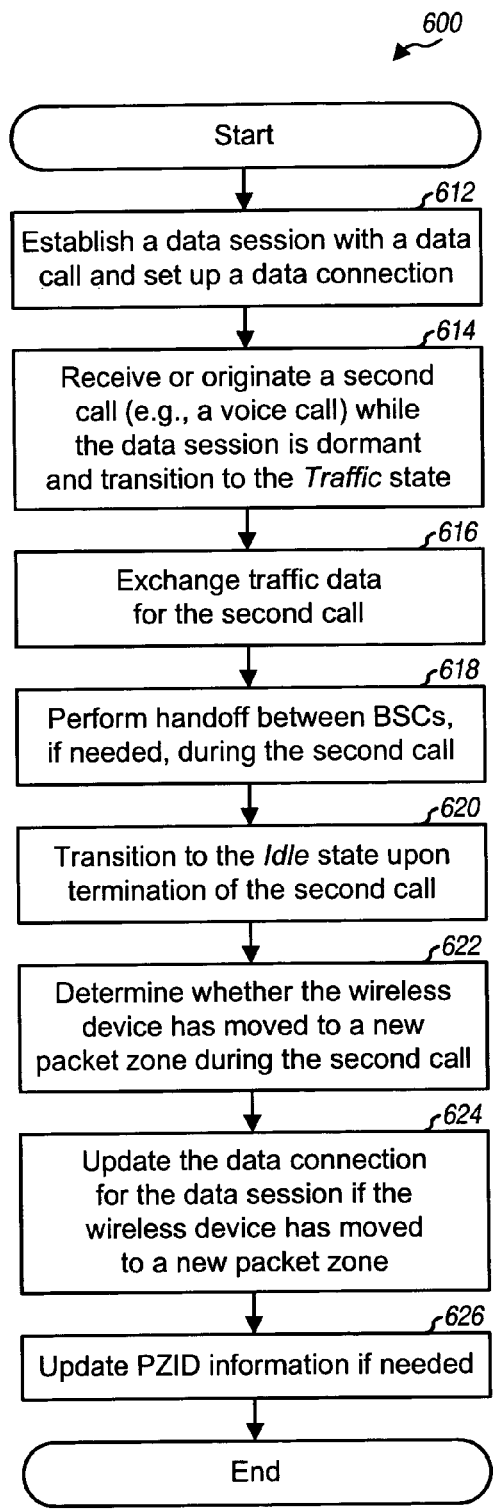
FIG. 6 shows a process performed by the wireless device to maintain data connectivity.

FIG. 6 shows a flow diagram of a process 600 performed by wireless device 110 to maintain data connectivity. Initially, wireless device 110 establishes a data session via a data call, and a data connection is set up for the data session (block 612). Thereafter, wireless device 110 receives or originates a second call while the data session is dormant and transitions to the Traffic state (block 614). The second call is a non-data call and may be, e.g., a voice call. Wireless device 110 exchanges traffic data for the second call (block 616) and performs handoff between BSCs, if needed, during the second call (block 618). Wireless device 110 transitions to the Idle state upon termination of the second call (block 620).

Wireless device 110 then determines whether it has moved to a new packet zone during the second call (block 622). This may be the case if wireless device 110 was handed off between BSCs that are located in different packet zones. This determination may be made by ascertaining the current PZID upon transitioning to the Idle state and determining whether this current PZID is in the PZID list. This determination may also be made by (1) ascertaining the PZID applicable at the start of the second call and the PZID applicable at the termination of the second call and (2) determining whether these two PZIDs are different. If wireless device 110 has moved to a new packet zone, then the data connection for the data session is updated (block 624). This may be achieved by sending to the current serving BSC (which is the target BSC for the handoff) an Origination Message with the DRS field set to '0' to indicate that there is no data to send. The network entities (e.g., BSC 142, PCF 152, and PDSN 170) perform the appropriate actions to update the registration and data connection for wireless device 110. Wireless device 110 updates its PZID information (e.g., the PZID list) if needed (block 626).

Figure 7:
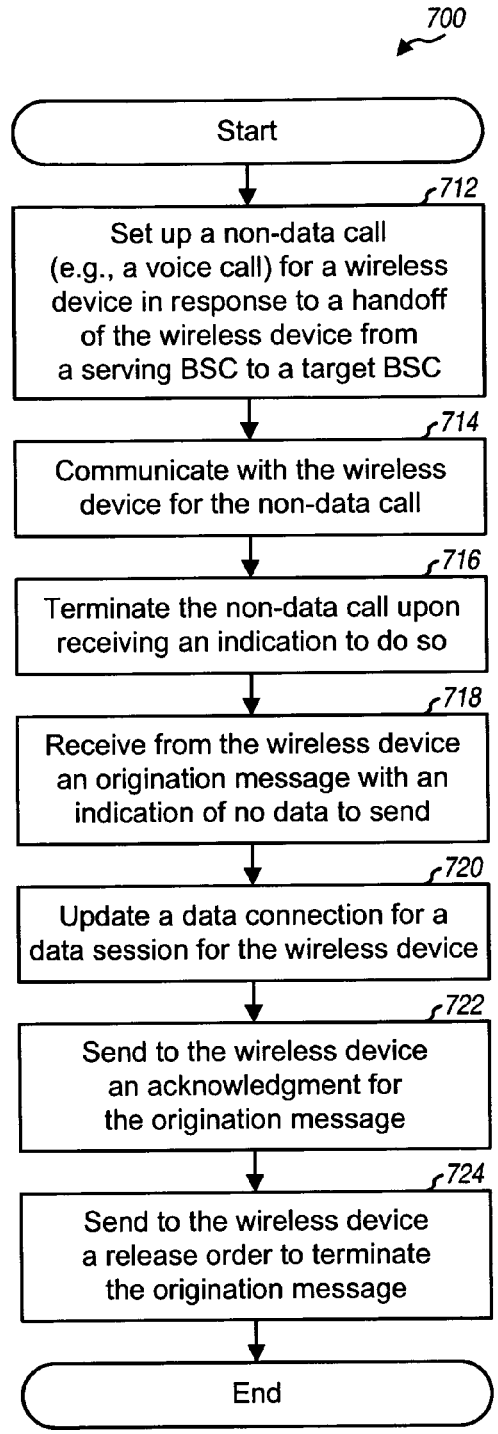
FIG. 7 shows a process performed by a BSC to maintain data connectivity for the wireless device.

FIG. 7 shows a flow diagram of a process 700 performed by target BSC 142 to maintain data connectivity for wireless device 110. Target BSC 142 may set up a non-data call (e.g., a voice call) for wireless device 110 in response to a handoff of the wireless device from serving BSC 140 to target BSC 142 (block 712). Wireless device has a dormant data session during the non-data call. Target BSC 142 communicates with wireless device 142 for the non-data call (step 714) and terminates the non-data call upon receiving an indication to do so (716). Thereafter, target BSC 142 receives from wireless device 110 an Origination Message with an indication of no data to send (step 718). This Origination Message was sent in response to a change in packet zone for wireless device 110 during the non-data call. Target BSC 142 updates a data connection for the data session for wireless device 110 (step 720). This may be achieved by sending an A9-Setup-A8 to target PCF 152. Target BSC 142 sends to wireless device 110 an Acknowledgment for the Origination Message (step 722) and further sends a Release Order to terminate the Origination Message (step 724).

The embodiments shown in FIGS. 4 through 7 may reduce the amount of signaling needed to maintain the correct registration and data connection since wireless device 110 updates the registration and data connection only if there is a change in packet zone. Furthermore, wireless device 110 updates the registration and data connection upon entering the Idle state at the end of a non-data call, so that wireless device 110 can receive data pages sent while in the Idle state. Wireless device 110 may move across any number of packet zones during the non-data call and does not need to update the registration and data connection for each new packet zone.

For clarity, the techniques have been specifically described above for cdma2000 using specific messages defined by cdma2000. As noted above, these techniques may also be used for other wireless networks, which will likely use other messages and procedures for establishing calls and data connections.

Figure 8:
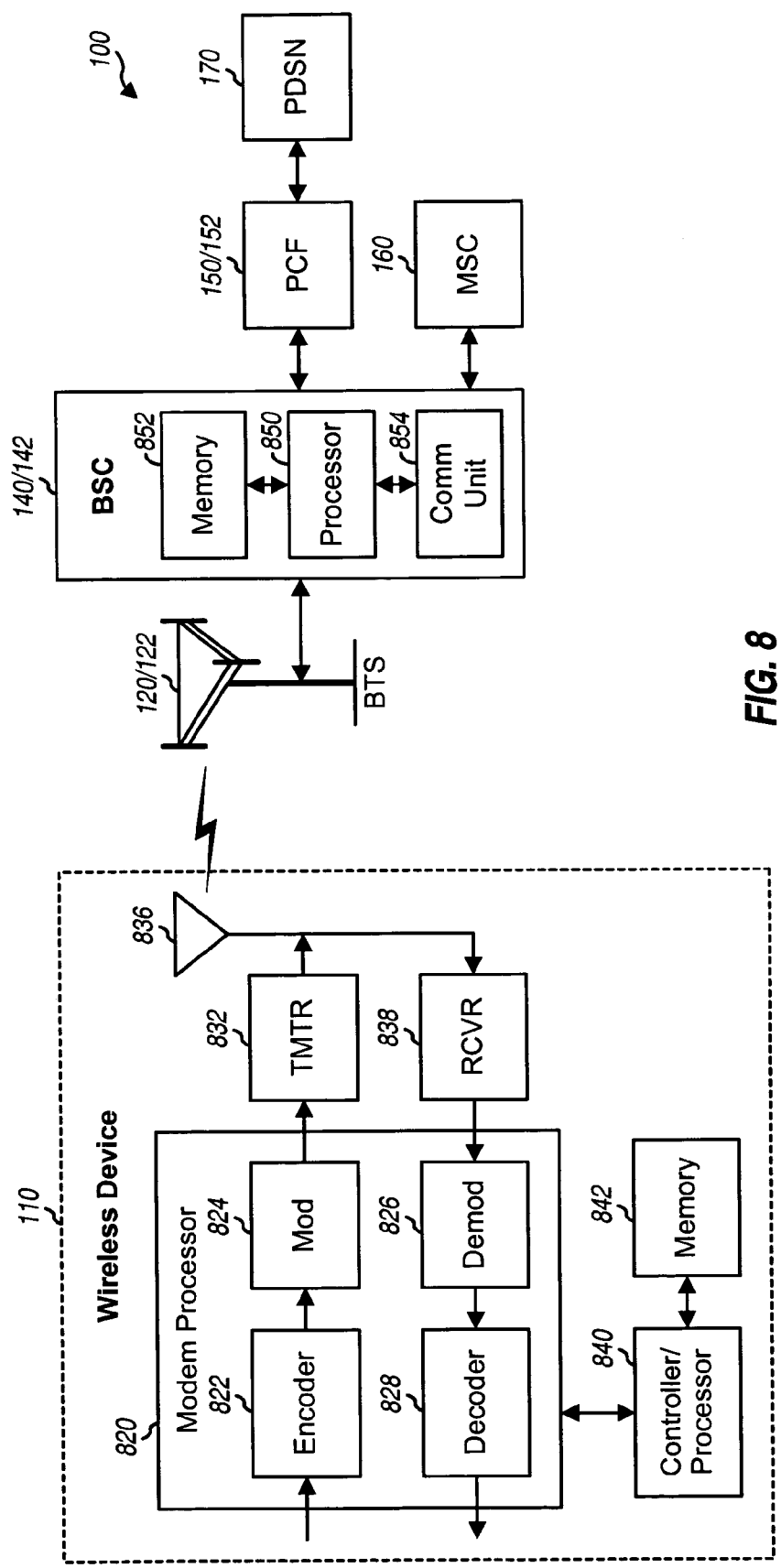
FIG. 8 shows a block diagram of the wireless device.

FIG. 8 shows a block diagram of an embodiment of wireless device 110. For this embodiment, wireless device 110 includes a wireless modem for bi-directional communication with wireless network 100, a controller/processor 840, and a memory 842. On the transmit path, data and signaling to be sent by wireless device 110 are processed (e.g., formatted, encoded, and interleaved) by an encoder 822 and further processed (e.g., modulated, spread, channelized, and scrambled) by a modulator (Mod) 824 to generate a stream of data chips. A transmitter unit (TMTR) 832 then conditions (e.g., converts to analog, filters, amplifies, and frequency upconverts) the data chip stream to generate a reverse link signal, which is transmitted via an antenna 836. On the receive path, forward link signals transmitted by BTS 120 and/or other BTSs are received by antenna 836 and provided to a receiver unit (RCVR) 838. Receiver unit 838 conditions (e.g., filters, amplifies, frequency downconverts, and digitizes) the received signal to generate data samples. A demodulator (Demod) 826 processes (e.g., descrambles, despreads, channelizes, and demodulates) the samples to obtain symbol estimates. A decoder 828 further processes (e.g., deinterleaves and decodes) the symbol estimates to obtain decoded data. Encoder 822, modulator 824, demodulator 826, and decoder 828 may be implemented by a modem processor 820. These units perform processing in accordance with the wireless technology (e.g., cdma2000) used by the wireless network.

Controller/processor 840 directs the operation of various units within wireless device 110. Controller/processor 840 may perform call flow 400 in FIG. 4, call flow 500 in FIG. 5, and/or process 600 in FIG. 6. Memory unit 842 stores program codes and data used by controller/processor 840 and other units.

For the embodiment shown in FIG. 8, BSC 140/142 includes a processor 850 that performs processing for the BSC, a memory unit 852 that stores program codes and data for processor 850, and a communication unit 854 that allows the BSC to communicate with the BTSs 120/122, PCF 150/152, and MSC 160. In general, each network entity may include one or more processors, memory units, communication units, controllers, and so on.

Figure 9:
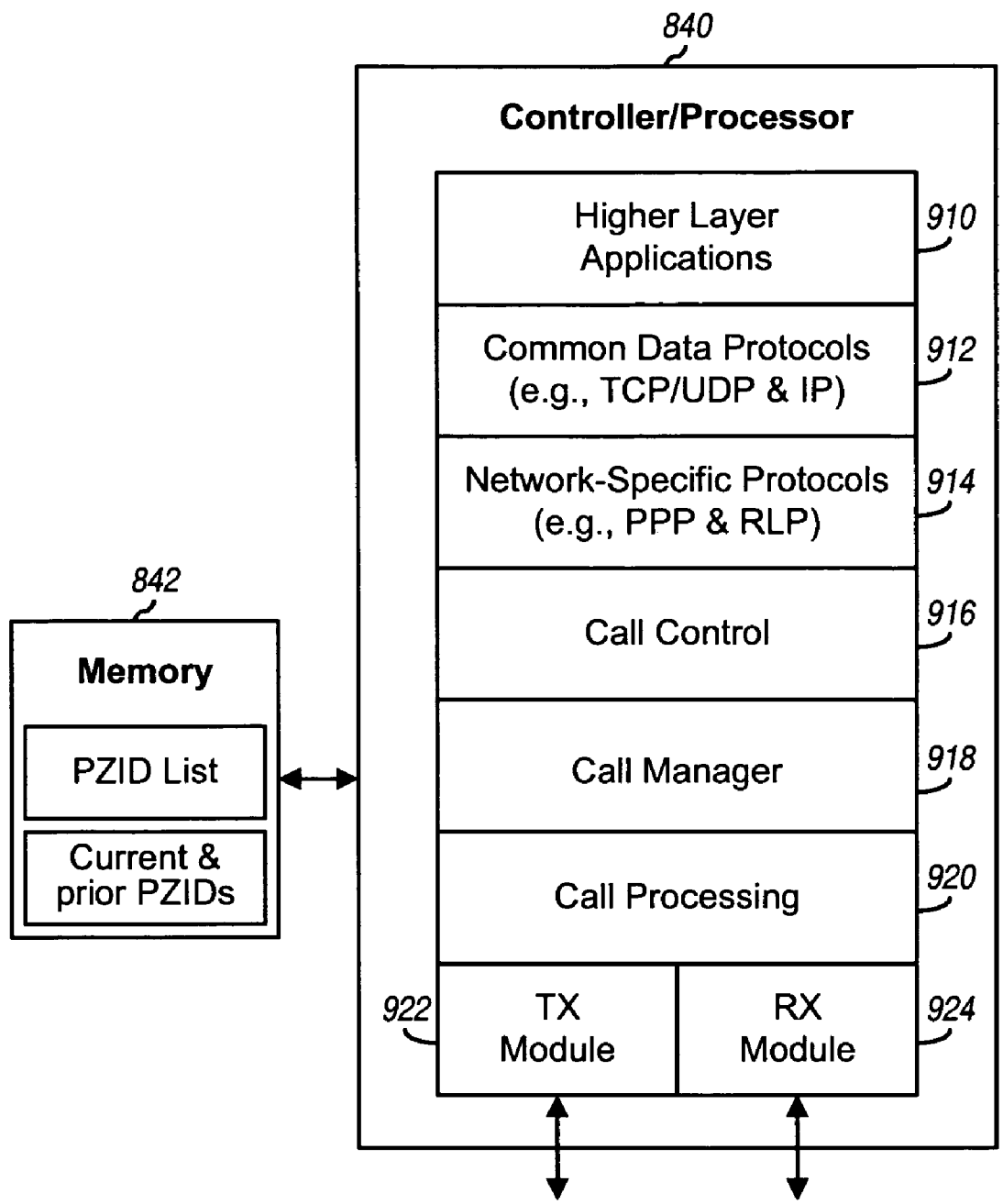
FIG. 9 shows a controller/processor within the wireless device.

FIG. 9 shows an embodiment of controller/processor 840 within wireless device 110. Within controller/processor 840, higher layer applications 910 include various end-user applications such as, e.g., data applications that provide data services, a user browser, an email client, and so on. The data applications can generate requests to originate packet data calls. A common data protocols module 912 supports various protocols used for packet data such as, e.g., Transmission Control Protocol (TCP), User Datagram Protocol (UDP), IP, and so on. A network-specific protocols module 914 supports various protocols used by the wireless network such as, e.g., PPP, a Radio Link Protocol (RLP), and so on.

A call control module 916 controls establishment and tear down of calls (e.g., data and voice calls), requests origination of calls, and keeps track of the wireless networks and packet zones for the wireless device. A call manager 918 manages calls, controls origination of data and other types of calls, and keeps track of the states of these calls. A call processing module 920 performs processing for signaling exchanged with the wireless network. A transmit (TX) module 922 controls the operation of the transmit portion of the wireless modem. A receive (RX) module 924 controls the operation of the receive portion of the wireless modem. Higher layer applications 910 communicate with common data protocols module 912, which utilizes network-specific protocol module 914. Call control module 916 supports higher layer applications and communicates with call manager 918, which further communicates with call processing module 920. Module 920 interfaces with TX module 922 and RX module 924.

In an embodiment, to maintain correct registration and data connection for a data session, call processing module 920 may store the current PZID and the previous PZID, e.g., in memory unit 842. The current PZID may be obtained via an ITSPM while in the Traffic state or via an ESPM while in the Idle state. Call processing module 920 may inform call control module 916 whenever there is a change in PZID. Call control module 916 may store the PZID list, e.g., in memory unit 842. Call control module 916 may query call processing module 920 for the current PZID at the end of each call upon transitioning to the Idle state and may initiate call flow 500 in FIG. 5 if the current PZID is not in the PZID list. Correct registration and data connection may also be maintained in other manners with other modules.

The techniques described herein may be implemented by various means. For example, these techniques may be implemented in hardware, software, or a combination thereof. For a hardware implementation, the processing units used to update registration and maintain data connection during a dormant data session (e.g., controller/processor 840 in FIGS. 8 and 9) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the techniques (e.g., modules 912 through 920 in FIG. 9) may be implemented with modules (e.g., procedures, functions, and so on) that perform the functions described herein. The software codes may be stored in a memory unit (e.g., memory unit 842 in FIG. 8) and executed by a processor (e.g., controller/processor 840). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of maintaining data connectivity comprising:
establishing, by a mobile wireless device, a data session with a network via a first call, wherein a data connection is set up for the data session;
establishing, by the wireless device, a second call while the data session is dormant;
determining, by the wireless device, whether the wireless device has moved to a new packet zone during the second call, wherein the determining occurs based upon terminating the second call;
updating, by the wireless device, the data connection for the data session with the network, based upon terminating the second call, if the wireless device has moved to a new packet zone; and
prohibiting the updating during the second call.

2. The method of claim 1, wherein the determining whether the wireless device has moved to a new packet zone comprises
determining a first packet zone identifier (PZID) applicable at the start of the second call,
determining a second PZID applicable at termination of the second call, and
indicating that the wireless device has moved to a new packet zone if the first PZID is different from the second PZID.

3. The method of claim 1, wherein the determining whether the wireless device has moved to a new packet zone comprises
determining a current packet zone identifier (PZID) upon terminating the second call,
determining whether the current PZID is in a PZID list, and
indicating that the wireless device has moved to a new packet zone if the current PZID is not in the PZID list.

4. The method of claim 1, further comprising:
transitioning to a traffic state upon establishing the second call;
transitioning to an idle state upon terminating the second call; and
performing the determining whether the wireless device has moved to a new packet zone and the updating the data connection for the data session upon transitioning to the idle state.

5. The method of claim 1, wherein the updating the data connection for the data session comprises
sending an origination message with an indication of no data to send.

6. The method of claim 1, further comprising:
storing a packet zone identifier (PZID) for the new packet zone; and
using the PZID for the data session.

7. The method of claim 1, further comprising:
performing a handoff from a first base station controller (BSC) to a second BSC during the second call.

8. The method of claim 7, wherein the second call is established via the first BSC and is terminated via the second BSC.

9. The method of claim 7, wherein the determining whether the wireless device has moved to a new packet zone comprises
determining a first packet zone identifier (PZID) associated with the first BSC,
determining a second PZID associated with the second BSC, and
indicating that the wireless device has moved to a new packet zone if the first PZID is different from the second PZID.

10. The method of claim 1, wherein the updating the data connection for the data session further comprises
sending to a base station controller (BSC) an origination message with an indication of no data to send,
receiving from the BSC an acknowledgment for the origination message, and
storing a packet zone identifier (PZID) associated with the BSC for the data session.

11. The method of claim 10, wherein the updating the data connection for the data session further comprises
updating a PZID list with the PZID associated with the BSC.

12. A mobile wireless device, comprising:
a processor operative
to establish a data session with a network via a first call,
to establish a second call while the data session is dormant, to determine whether the wireless device has moved to a new packet zone during the second call based upon terminating the second call, and to update a data connection for the data session with the network, based upon terminating the second call, if the wireless device has moved to a new packet zone; and a memory operative to store information for the data session.

13. The wireless device of claim 12, wherein the processor is operative to determine a first packet zone identifier (PZID) applicable at the start of the second call, to determine a second PZID applicable at termination of the second call, and to determine that the wireless device has moved to a new packet zone if the first PZID is different from the second PZID.

14. The wireless device of claim 12, wherein the memory is operative to store a packet zone identifier (PZID) for the new packet zone, and wherein the processor is operative to use the PZID for the data session.

15. The wireless device of claim 12, wherein the processor is operative to perform a handoff from a first base station controller (BSC) to a second BSC during the second call, to determine a first packet zone identifier (PZID) associated with the first BSC, to determine a second PZID associated with the second BSC, and to determine that the wireless device has moved to a new packet zone if the first PZID is different from the second PZID.

16. The wireless device of claim 12, wherein to update the data connection for the data session the processor is operative to send an origination message with an indication of no data to send.

17. A mobile wireless device, comprising:
means for establishing a data session with a network via a first call, wherein a data connection is set up for the data session;
means for establishing a second call while the data session is dormant;
means for determining whether the wireless device has moved to a new packet zone during the second call based upon terminating the second call; and
means for updating the data connection for the data session with the network, based upon terminating the second call, if the wireless device has moved to a new packet zone.

18. The wireless device of claim 17, wherein the means for determining whether the wireless device has moved to a new packet zone comprises
means for determining a first packet zone identifier (PZID) applicable at the start of the second call,
means for determining a second PZID applicable at termination of the second call, and
means for indicating that the wireless device has moved to a new packet zone if the first PZID is different from the second PZID.

19. The wireless device of claim 17, further comprising:
means for performing a handoff from a first base station controller (BSC) to a second BSC during the second call;
means for determining a first packet zone identifier (PZID) associated with the first BSC;
means for determining a second PZID associated with the second BSC; and
means for indicating that the wireless device has moved to a new packet zone if the first PZID is different from the second PZID.

20. The wireless device of claim 17, wherein the means for updating the data connection for the data session comprises
means for sending an origination message with an indication of no data to send.

21. A non-transitory processor readable media for storing instructions operable in a mobile wireless device to:
establish a data session with a network via a first call, wherein a data connection is set up for the data session;
establish a second call while the data session is dormant;
determine whether the wireless device has moved to a new packet zone during the second call based upon terminating the second call; and
update the data connection for the data session with the network, based upon terminating the second call, if the wireless device has moved to a new packet zone.

22. The processor-readable media of claim 21, and further for storing instructions operable to:
determine a first packet zone identifier (PZID) applicable at the start of the second call;
determine a second PZID applicable at termination of the second call; and
indicate that the wireless device has moved to a new packet zone if the first PZID is different from the second PZID.

23. The processor-readable media of claim 21, and further for storing instructions operable to:
perform a handoff from a first base station controller (BSC) to a second BSC during the second call;
determine a first packet zone identifier (PZID) associated with the first BSC;
determine a second PZID associated with the second BSC; and
indicate that the wireless device has moved to a new packet zone if the first PZID is different from the second PZID.

24. The processor-readable media of claim 21, and further for storing instructions operable to:
send an origination message with an indication of no data to send.

25. A method of maintaining data connectivity for a wireless device comprising:
communicating with a wireless device for a non-data call, the wireless device having a data session that is dormant during the non-data call;
terminating the non-data call;
receiving from the wireless device an origination message with an indication of no data to send, wherein the origination is sent in response to a change in packet zone for the wireless device during the non-data call, wherein the origination message is further sent based upon the terminating of the non-data call; and
updating a data connection for the data session for the wireless device.

26. The method of claim 25, further comprising:
setting up the non-data call for the wireless device in response to a handoff of the wireless device from a first base station controller (BSC) to a second BSC.

27. The method of claim 25, wherein the updating the data connection for the data session for the wireless device comprises
sending a setup message to a packet control function (PCF) serving the new packet zone.

28. The method of claim 25, further comprising:
sending to the wireless device an acknowledgment for the origination message.

29. The method of claim 25, further comprising:
sending to the wireless device a release order to terminate the origination message.

30. An apparatus comprising:
a communication unit operative to communicate with a wireless device for a non-data call, the wireless device having a data session that is dormant during the non-data call; and
a processor operative to terminate the non-data call, to receive from the wireless device an origination message with an indication of no data to send, and to update a data connection for the data session for the wireless device in response to the origination message, wherein the origination message is sent in response to a change in packet zone for the wireless device during the non-data call, wherein the origination message is further sent based upon the terminating of the non-data call.

31. The apparatus of claim 30, wherein the processor is operative to set up the non-data call for the wireless device in response to a handoff of the wireless device from a first base station controller (BSC) to a second BSC.

32. An apparatus comprising:
means for communicating with a wireless device for a non-data call, the wireless device having a data session that is dormant during the non-data call;
means for terminating the non-data call;
means for receiving from the wireless device an origination message with an indication of no data to send, wherein the origination is sent in response to a change in packet zone for the wireless device during the non-data call, wherein the origination message is further sent based upon the terminating of the non-data call; and
means for updating a data connection for the data session for the wireless device in response to the origination message.

33. The apparatus of claim 32, further comprising:
means for setting up the non-data call for the wireless device in response to a handoff of the wireless device from a first base station controller (BSC) to a second BSC.

34. A method of maintaining data connectivity, comprising:
establishing, by a mobile wireless device, a data session with a network via a first call, wherein a data connection is set up for the data session;
establishing, by the wireless device, a second call while the data session is dormant;
determining, by the wireless device, whether the wireless device has moved to a new packet zone during the second call;
updating, by the wireless device, the data connection for the data session with the network if the wireless device has moved to a new packet zone; and
terminating the second call, wherein the establishing of the second call corresponds to a traffic state, wherein the terminating corresponds to an idle state, and wherein the determining and the updating only occur in the idle state.

35. The wireless device of claim 12, wherein the processor is further operative to prohibit the updating during the second call.

36. A wireless device, comprising:
a processor operative
to establish a data session with a network via a first call,
to establish a second call while the data session is dormant,
to determine whether the wireless device has moved to a new packet zone during the second call,
to update a data connection for the data session with the network, based upon terminating the second call, if the wireless device has moved to a new packet zone, and
to terminate the second call, wherein the second call corresponds to a traffic state, wherein the terminating of the second call corresponds to an idle state, and wherein the determining and the updating only occur in the idle state; and
a memory operative to store information for the data session.

37. The wireless device of claim 17, further comprising means for prohibiting the updating during the second call.

38. A wireless device comprising:
means for establishing a data session with a network via a first call, wherein a data connection is set up for the data session;
means for establishing a second call while the data session is dormant;
means for determining whether the wireless device has moved to a new packet zone during the second call based;
means for updating the data connection for the data session with the network, based upon terminating the second call, if the wireless device has moved to a new packet zone; and
means for terminating the second call and transitioning from a traffic state to an idle state, wherein the second call corresponds to the traffic state, and wherein the means for determining and the means for updating are operative only in the idle state.

39. The processor readable media of claim 21, and further for storing instructions operable to prohibit the updating during the second call.

40. A non-transitory processor readable media for storing instructions operable in a mobile wireless device to:
establish a data session with a network via a first call, wherein a data connection is set up for the data session;
establish a second call while the data session is dormant;
determine whether the wireless device has moved to a new packet zone during the second call;
update the data connection for the data session with the network, based upon terminating the second call, if the wireless device has moved to a new packet zone; and
terminate the second call, wherein the second call corresponds to a traffic state, wherein the terminating of the second call corresponds to an idle state, and wherein the determining and the updating only occur in the idle state.

41. The method of claim 34, further comprising:
transitioning to a traffic state upon establishing the second call;
transitioning to an idle state upon terminating the second call; and
performing the determining whether the wireless device has moved to a new packet zone and the updating the data connection for the data session upon transitioning to the idle state.

42. The wireless device of claim 36, wherein the processor is further operative
to transition to a traffic state upon establishing the second call;
to transition to an idle state upon terminating the second call; and
to perform the determining whether the wireless device has moved to a new packet zone and the updating the data connection for the data session upon transitioning to the idle state.

* * * * *